(12) United States Patent
Shinya

(10) Patent No.: US 12,530,763 B2
(45) Date of Patent: Jan. 20, 2026

(54) INSPECTION APPARATUS, METHOD OF CONTROLLING THE SAME, AND STORAGE MEDIUM

(71) Applicant: CANON KABUSHIKI KAISHA, Tokyo (JP)

(72) Inventor: Takeshi Shinya, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 355 days.

(21) Appl. No.: 18/319,104

(22) Filed: May 17, 2023

(65) Prior Publication Data

US 2023/0401695 A1 Dec. 14, 2023

(30) Foreign Application Priority Data

Jun. 8, 2022 (JP) .................................. 2022-093097

(51) Int. Cl.
*G06T 7/00* (2017.01)
*G06T 3/40* (2006.01)
(Continued)

(52) U.S. Cl.
CPC ................ *G06T 7/001* (2013.01); *G06T 3/40* (2013.01); *G06T 5/50* (2013.01); *G06T 5/70* (2024.01);
(Continued)

(58) Field of Classification Search
CPC ........... G06T 2207/30144; G06T 7/001; G06T 2207/10024; G06T 2207/10008;
(Continued)

(56) References Cited

U.S. PATENT DOCUMENTS

2004/0264764 A1* 12/2004 Kochi ..................... H01J 37/28
382/154
2008/0225353 A1* 9/2008 Imafuku ............ H04N 1/00771
358/488
(Continued)

FOREIGN PATENT DOCUMENTS

JP 2021043032 A 3/2021

OTHER PUBLICATIONS

Valente, Augusto, et al. "Print defect mapping with semantic segmentation." Proceedings of the IEEE/CVF winter conference on applications of computer vision. 2020.*

(Continued)

*Primary Examiner* — Li Liu
(74) *Attorney, Agent, or Firm* — ROSSI, KIMMS & McDOWELL LLP

(57) ABSTRACT

The present invention provides an inspection apparatus that inspects an image formed on a recording medium by a printing apparatus. The inspection apparatus stores, as a reference image, image data used to form an image on the recording medium, obtains target image data to be inspected, by reading an image to be inspected formed on the recording medium. The inspection apparatus applies noise components to the reference image, aligns the reference image to which the noise components have been applied with the target image data, and performs collation processing between the reference image and the target image data that have been aligned.

15 Claims, 13 Drawing Sheets

(51) Int. Cl.
*G06T 5/50* (2006.01)
*G06T 5/70* (2024.01)
*G06T 7/11* (2017.01)
*G06V 10/24* (2022.01)
*G06V 10/75* (2022.01)
*H04N 1/60* (2006.01)

(52) U.S. Cl.
CPC ............... *G06T 7/11* (2017.01); *G06V 10/24* (2022.01); *G06V 10/751* (2022.01); *H04N 1/6016* (2013.01); *G06T 2207/20221* (2013.01); *G06T 2207/30144* (2013.01)

(58) Field of Classification Search
CPC ......... G06T 7/0002; G06T 2207/30168; G06T 7/0004; G06T 7/0008; G06V 10/24; G06V 10/751; G06V 30/418; H04N 1/00681
See application file for complete search history.

(56) References Cited

U.S. PATENT DOCUMENTS

| | | | |
|---|---|---|---|
| 2013/0136315 A1* | 5/2013 | Kawamoto | G06T 7/001 |
| | | | 382/112 |
| 2021/0073966 A1 | 3/2021 | Teshima et al. | |
| 2022/0318977 A1* | 10/2022 | Ishii | G06T 7/0008 |
| 2022/0351356 A1* | 11/2022 | Shin | G06T 7/0002 |
| 2023/0066402 A1* | 3/2023 | Haruta | G06T 7/001 |

OTHER PUBLICATIONS

Eerola, Tuomas, et al. "Full reference printed image quality: Measurement framework and statistical evaluation." Journal of Imaging Science and Technology 54.1 (2010): 10201-1.*

* cited by examiner

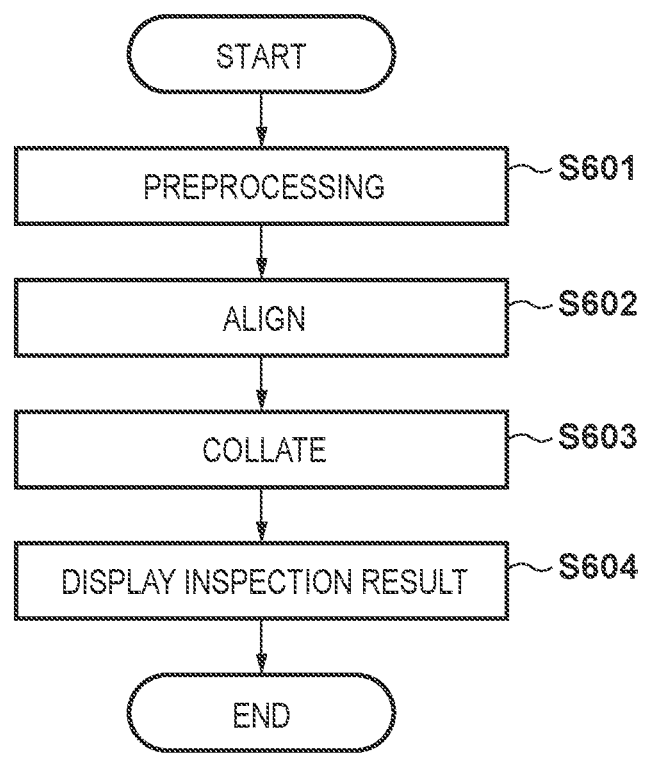

| | i=1 | i=2 | | | | | | 701 |
|---|---|---|---|---|---|---|---|---|
| j=0 0 | 1 | 2 | 2 | 1 | 0 | 2 | 1 | 0 |
| 1 | 1 | 1 | 1 | 1 | 1 | 2 | 0 | 1 |
| 0 | 1 | 0 | 1 | 1 | 1 | 1 | 2 | 2 |
| 2 | 0 | 2 | 1 | 0 | 2 | 0 | 1 | 1 |
| 1 | 2 | 0 | 0 | 2 | 1 | 2 | 1 | 0 |
| 0 | 1 | 1 | 1 | 1 | 1 | 0 | 1 | 1 |
| 1 | 2 | 0 | 2 | 1 | 0 | 0 | 1 | 2 |
| 2 | 2 | 1 | 1 | 1 | 1 | 1 | 1 | 1 |
| 0 | 0 | 0 | 2 | 1 | 0 | 0 | 1 | 2 |

| | | | | | | | | 702 |
|---|---|---|---|---|---|---|---|---|
| 0 | 3 | 5 | 5 | 3 | 0 | 5 | 3 | 0 |
| 3 | 3 | 3 | 3 | 3 | 3 | 5 | 0 | 3 |
| 0 | 3 | 0 | 3 | 3 | 3 | 3 | 5 | 5 |
| 5 | 0 | 5 | 3 | 0 | 5 | 0 | 3 | 3 |
| 3 | 5 | 0 | 0 | 5 | 3 | 5 | 3 | 0 |
| 0 | 3 | 3 | 3 | 3 | 3 | 0 | 3 | 3 |
| 3 | 5 | 0 | 5 | 3 | 0 | 0 | 3 | 5 |
| 5 | 5 | 3 | 3 | 3 | 3 | 3 | 3 | 3 |
| 0 | 0 | 0 | 5 | 3 | 0 | 0 | 3 | 5 |

INSPECTION IMAGE

SEARCH REGION OF REFERENCE IMAGE $$\begin{pmatrix} x' \\ y' \end{pmatrix} = \begin{pmatrix} a & b \\ c & d \end{pmatrix} \begin{pmatrix} x \\ y \end{pmatrix} + \begin{pmatrix} e \\ f \end{pmatrix}$$

| C | M | Y | K | R | G | B |
|---|---|---|---|---|---|---|
| 0 | 0 | 0 | 0 | 220 | 220 | 220 |
| 31 | 0 | 0 | 0 | 200 | 215 | 220 |
| 63 | 0 | 0 | 0 | 170 | 210 | 220 |
| ... | ... | ... | ... | ... | ... | ... |
| 255 | 255 | 255 | 255 | 3 | 3 | 3 |

INSPECTION APPARATUS, METHOD OF CONTROLLING THE SAME, AND STORAGE MEDIUM

BACKGROUND OF THE INVENTION

Field of the Invention

The present invention relates to an inspection apparatus, a method of controlling the same, and a storage medium.

Description of the Related Art

Printed products printed by and output from a printing apparatus may be soiled by coloring materials such as ink, toner, or the like adhering to unintended areas. Alternatively, an insufficient amount of coloring material may adhere to areas where an image should be formed, resulting in color omission, where the color is lighter than intended. Such printed product defects, such as soiling and color omissions, cause a drop in the quality of the printed product. Therefore, it is necessary to inspect the printed product for defects and ensure the quality of the printed product.

Visual inspection, in which an inspector visually inspects for printed product defects, requires significant time and incurs significant costs, and thus in recent years, inspection systems have been proposed that inspect automatically without relying on visual inspections. Specifically, the image quality is determined by aligning a digital image used for printing (a reference image) with scanned image data obtained by scanning the printed product ("scanned image" hereinafter), and executing processing for collating the images to determine whether there are any defects.

Japanese Patent Laid-Open No. 2021-43032 describes a method of performing an inspection by converting a reference image rendered in the CMYK color space into the RGB color space, which is the same color space as that of the scanned image. According to the method disclosed in Japanese Patent Laid-Open No. 2021-43032, the occurrence of erroneous detections is suppressed by taking into account errors caused by the state of the scanner, the accuracy of the color conversion, and the like when comparing the reference image, which is a digital image, with the scanned image.

However, simply bringing the reference image and the scanned image closer to each other through color matching results in erroneous detections occurring due to noise. This is because whereas the reference image is digital data and thus is a uniform image, the scanned image is image data containing a large amount of noise due to the surface properties, uneven transmittance of the paper, the S/N ratio of the scanner, and the like. Accordingly, when the reference image and the scanned image are compared as-is, differences increase from part to part, resulting in erroneous detections in which defects are detected erroneously.

SUMMARY OF THE INVENTION

Embodiments of the present disclosure eliminate the above-mentioned issues with conventional technology.

A feature of the present disclosure is to provide a technique for suppressing erroneous detections and improving the inspection precision when collating a reference image and a scanned image to be inspected.

According to a first aspect of embodiments of the present disclosure, there is provided an inspection apparatus that inspects an image formed on a recording medium by a printing apparatus, the inspection apparatus comprising: one or more controllers including one or more processors and one or more memories, the one or more controllers being configured to: store, as a reference image, image data used to form an image on the recording medium; obtain target image data to be inspected, by reading an image to be inspected formed on the recording medium; apply noise components to the reference image; align the reference image to which the noise components have been applied with the target image data; and perform collation processing between the reference image and the target image data that have been aligned.

According to a second aspect of embodiments of the present disclosure, there is provided an inspection apparatus that inspects an image formed on a recording medium by a printing apparatus, the inspection apparatus comprising: one or more controllers including one or more processors and one or more memories, the one or more controllers being configured to: store, as a reference image, image data obtained by scanning an image formed on the recording medium; obtain target image data to be inspected, the image data being obtained by scanning an image to be inspected formed on the recording medium; align the reference image and the target image data; and perform collation processing between the reference image and the target image data that have been aligned.

Further features of the present disclosure will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the disclosure and, together with the description, serve to explain the principles of the disclosure.

FIG. 6 is a flowchart for describing inspection processing performed by the inspection apparatus according to the first embodiment.

DESCRIPTION OF THE EMBODIMENTS

Embodiments of the present disclosure will be described hereinafter in detail, with reference to the accompanying drawings. It is to be understood that the following embodiments are not intended to limit the claims of the present disclosure, and that not all of the combinations of the aspects that are described according to the following embodiments are necessarily required with respect to the means to solve the issues according to the present disclosure.

Figure 1:
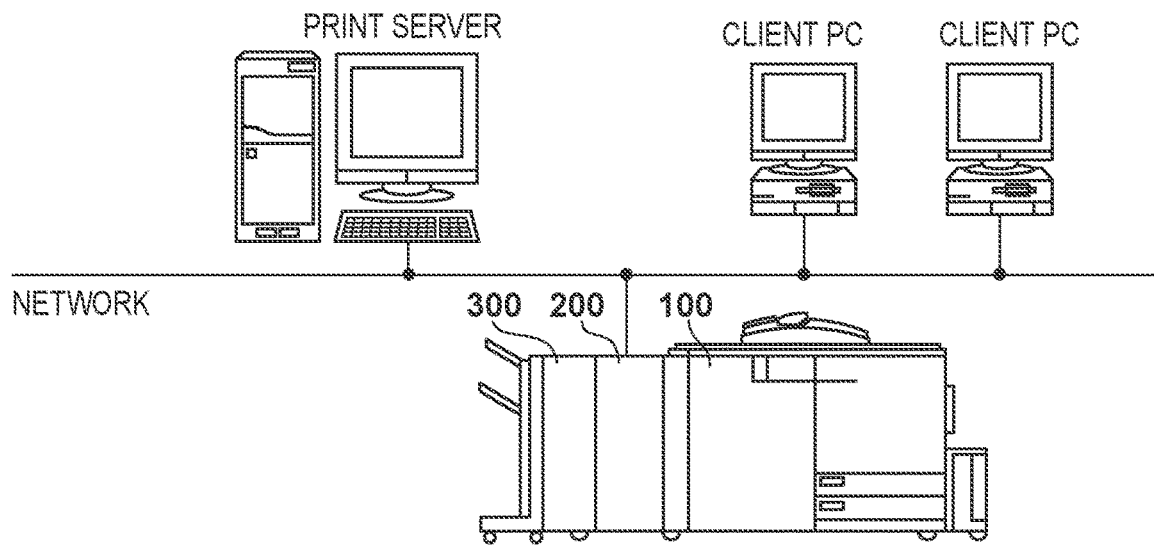
FIG. 1 is a diagram illustrating an example of the configuration of an inspection system including an inspection apparatus according to a first embodiment of the present invention.

FIG. 1 is a diagram illustrating an example of the configuration of an inspection system including an inspection apparatus according to a first embodiment of the present invention.

An image forming apparatus (printing apparatus) 100 processes various types of input data, prints onto a recording medium such as paper, sheets, or the like, and generates a printed product. An inspection apparatus (image processing apparatus) 200 receives the printed product output from the image forming apparatus 100 and inspects the content of the printed product. A finisher 300 receives the printed product inspected by the inspection apparatus 200 and performs post-processing such as book binding, stitching, punching, and the like, for example. The image forming apparatus 100 is connected to an external print server, a client PC, and the like over a network. The inspection apparatus 200 is connected to the image forming apparatus 100 one-to-one by a communication cable. The finisher 300 is also connected to the image forming apparatus 100 one-to-one by another communication cable. The inspection apparatus 200 and the finisher 300 are also connected to each other by yet another communication cable. The first embodiment will describe an example of an in-line inspection system that performs image formation, image inspection, and finishing in an integrated manner.

Figure 2:
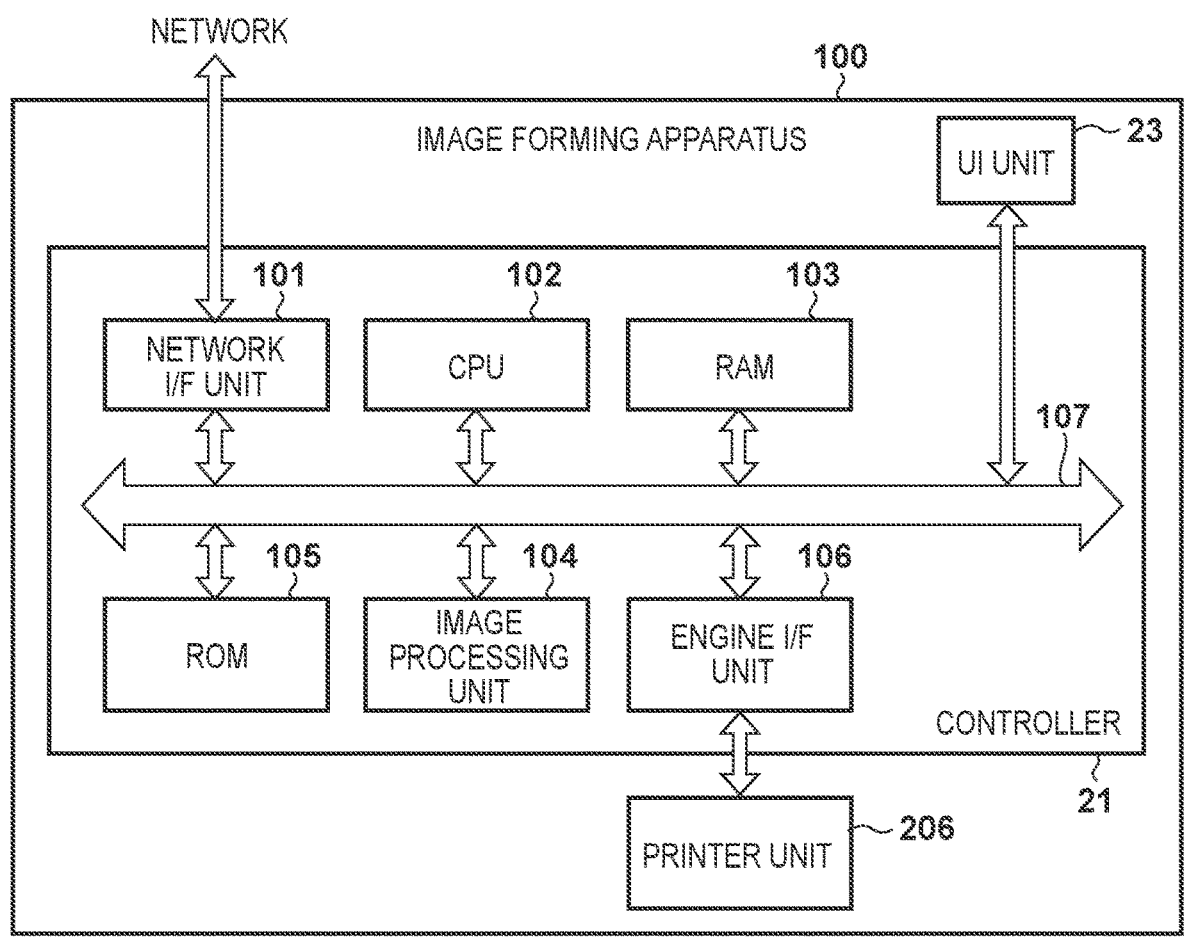
FIG. 2 is a block diagram for describing the hardware configuration of an image forming apparatus according to the first embodiment.

FIG. 2 is a block diagram for describing the hardware configuration of the image forming apparatus 100 according to the first embodiment.

The image forming apparatus 100 includes a controller (control unit) 21, a printer unit 206, and a user interface (UI) unit (console unit) 23. Note that the UI unit 23 includes various types of switches, LEDs, indicators, and the like for performing operations.

Image data, document data, and the like transmitted to the image forming apparatus 100 are created by a software application such as a printer driver (not shown) in a client PC or a print server on a network. The image data, document data, and the like are transmitted to the image forming apparatus 100 as page description language (PDL) data over the network (e.g., a Local Area Network). In the image forming apparatus 100, the controller 21 receives the transmitted PDL data.

The controller 21 is connected to the UI unit 23 and the printer unit 206, receives the PDL data transmitted from the client PC or the print server, converts the PDL data into print data that can be processed by the printer unit 206, and outputs the print data to the printer unit 206. The printer unit 206 prints an image based on the print data output from the controller 21. Note that the printer unit 206 according to the first embodiment is assumed to have a printing engine using an electro-photographic method. However, the printing method is not limited thereto, and the ink jet method may be used instead, for example.

The UI unit 23 is operated by a user, and is used to select various functions and make operation instructions. The UI unit 23 includes a display provided with a touch panel on its surface, a keyboard in which various types of keys such as a start key, a stop key, a numerical keypad, and the like are provided, and the like.

The controller 21 will be described in detail next.

The controller 21 includes a network interface (I/F) unit 101, a CPU 102, a RAM 103, a ROM 104, an image processing unit 105, an engine I/F unit 106, and an internal bus 107. The network I/F unit 101 receives the PDL data transmitted from the client PC or the print server over the network. The CPU 102 controls the image forming apparatus 100 as a whole using programs, data, and the like stored in the RAM 103, the ROM 104, and the like, and executes the processing performed by the controller 21 (described later). The RAM 103 has a work area used by the CPU 102 when executing various types of processing. Programs, data, and the like for causing the CPU 102 to execute the various types of processing described later, settings data for the controller 21, and the like are stored in the ROM 104.

In accordance with settings from the CPU 102, the image processing unit 105 performs image processing for printing on the PDL data received by the network I/F unit 101, and generates print data that can be output by the printer unit 206. In particular, the image processing unit 105 generates image data having a plurality of color components per pixel by rasterizing the received PDL data. Here, "plurality of color components" refers to independent color components in a color space such as, for example, RGB (red, green, and blue). The image data has a value of 8 bits (256 tones) for each color component in each pixel. In other words, the image data is multivalued bitmap data including multivalued pixel data. In addition to the image data, the rasterization also generates attribute data indicating pixel attributes of the image data for each pixel. This attribute data indicates what type of object the pixel belongs to, and is a value indicating the type of the object, such as text, a line, a graphic, an image, or a background, for example. The image processing unit 105 generates the print data by performing image processing such as color conversion from the RGB color space to the CMYK (cyan, magenta, yellow, and black) color space, screen processing, and the like using the generated image data and attribute data. The engine I/F unit 106 is an interface that outputs the print data generated by the image processing unit 105 to the printer unit 206. The internal bus 107 is a system bus that connects the aforementioned units to each other.

Figure 3:
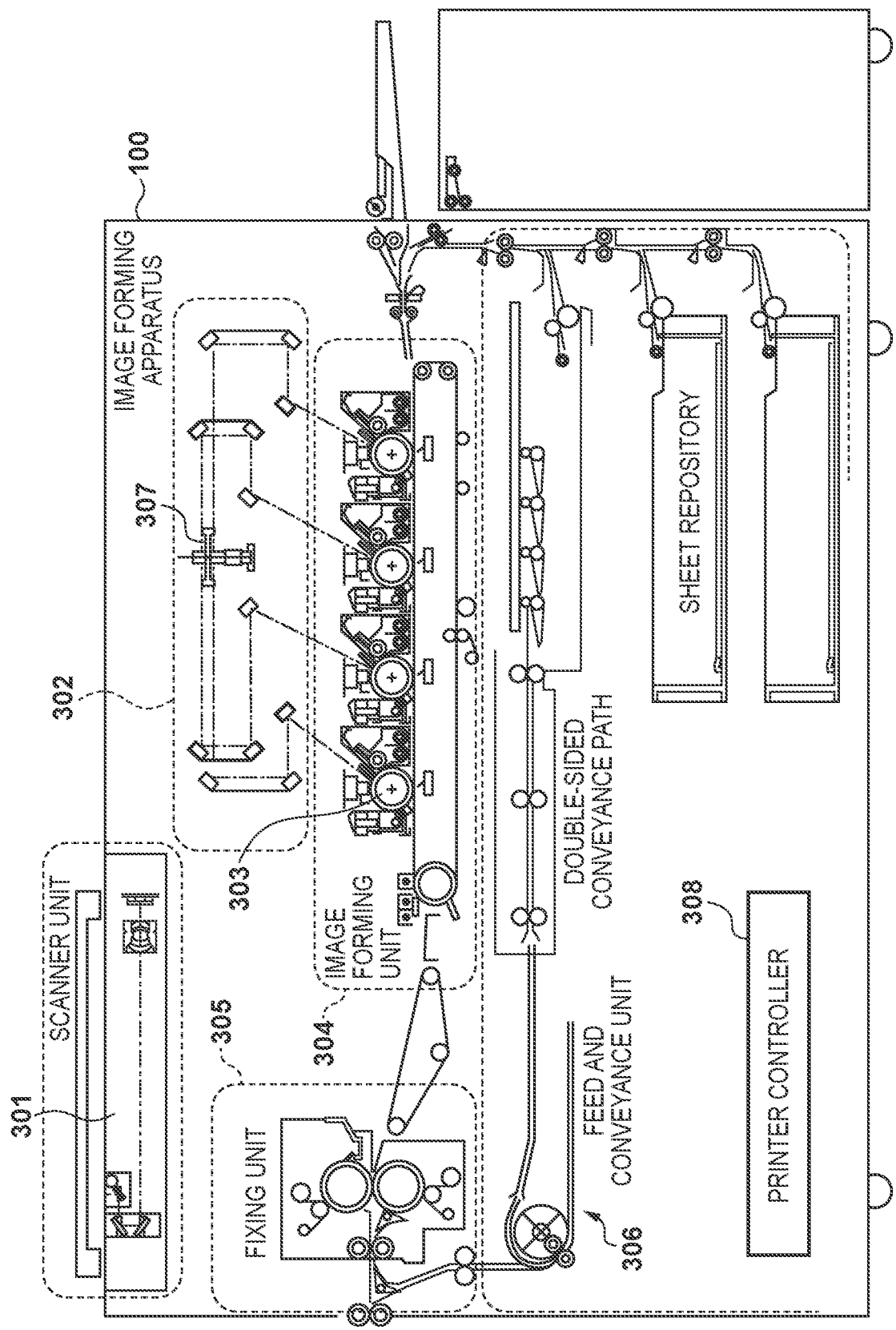
FIG. 3 is a diagram illustrating the configuration of a printer unit of the image forming apparatus according to the first embodiment.

FIG. 3 is a diagram illustrating the configuration of the printer unit 206 of the image forming apparatus 100 according to the first embodiment.

The image forming apparatus 100 includes a scanner unit 301, a laser exposure unit 302, photosensitive drums 303, an image forming unit 304, a fixing unit 305, a feed and conveyance unit 306, and a printer controller 308 that controls these units. The scanner unit 301 applies illumination to a document placed on a platen and optically reads an image of the document, which is converted into an electrical signal to generate image data.

The laser exposure unit 302 causes beams of laser light or the like modulated in accordance with the image data to be incident on a rotating polygonal mirror 307 rotating at a constant angular velocity, and each of the photosensitive drums 303 is irradiated with the resulting reflected each light as scanning light. The image forming unit 304 rotationally drives the photosensitive drums 303 and applies an electrostatic charge thereto using chargers, and develops a latent image formed on each of the photosensitive drums 303 by the laser exposure unit 302 using toner. This is realized by having a series of four developing units (developing stations) that each performs a series of electrophotographic processes, such as transferring the toner image onto a sheet and collecting the minute toner that remains in the photosensitive drums 303 without being transferred at that time.

The four developing units, which are arranged in order of cyan (C), magenta (M), yellow (Y), and black (K), execute image forming operations in the order of magenta, yellow, and black, after a predetermined amount of time has elapsed since the start of image forming in the cyan station.

The fixing unit 305 includes a combination of rollers, belts, and the like, with a heat source such as a halogen heater provided in a heating roller, which uses heat and pressure to melt and fix the toner image on the sheet to which the toner image has been transferred by the image forming unit 304 onto the sheet. Note that when printing on thick paper, the sheet is thick and has poor thermal conductivity, and it is therefore necessary to set the conveyance speed of the sheet passing through the fixing unit 305 to, for example, half the normal speed. As a result, when printing onto thick paper, the conveyance speed of the sheets in the various units other than the fixing unit 305 is also halved, and thus the printing speed itself of the image forming apparatus 100 is halved.

The feed and conveyance unit 306 includes at least one sheet repository, such as a sheet cassette or a paper tray, and in response to an instruction from the printer controller 308, the feed and conveyance unit 306 separates a single sheet from a plurality of sheets stored in the sheet repository and transports that sheet to the image forming unit 304. The sheet onto which the toner image has been transferred by the image forming unit 304 is furthermore conveyed to the fixing unit 305. In this manner, the sheet is conveyed, and the aforementioned developing stations transfer the toner images of each color, resulting in a full-color toner image ultimately being formed on the sheet. When an image is to be formed on both sides of the sheet, control is performed such that the sheet that has passed through the fixing unit 305 also passes through a conveyance path that conveys the sheet to the image forming unit 304 a second time.

The printer controller 308 communicates with the controller 21, which controls the image forming apparatus 100 as a whole, and executes control in response to instructions therefrom. The printer controller 308 also manages the states of the abovementioned scanner, laser exposure, image forming, fixing, and feed and conveyance units, and issues instructions such that the units can operate smoothly in harmony with one another.

Figure 4A:
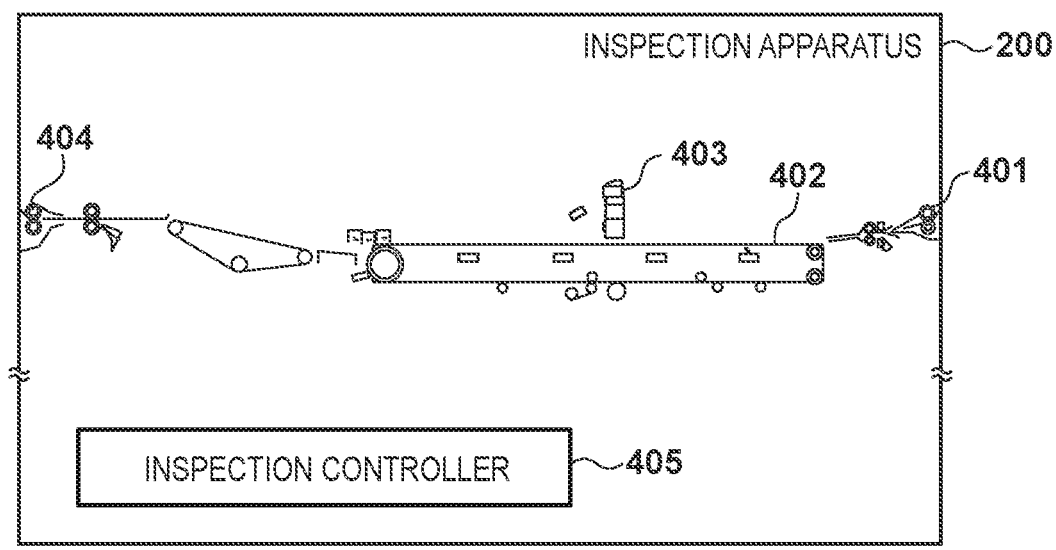
FIG. 4A is a schematic diagram illustrating the internal configuration of the inspection apparatus according to the first embodiment.

FIG. 4A is a schematic diagram illustrating the internal configuration of the inspection apparatus 200 according to the first embodiment.

A sheet printed onto and discharged by the image forming apparatus 100 (a printed product) is taken into the inspection apparatus 200 by feed rollers 401. The printed product is then conveyed by a conveyor belt 402 and read by an inspection sensor 403 located above the conveyor belt 402. An inspection controller 405 performs inspection processing using the image data (a scanned image (an inspection image)) read by the inspection sensor 403. The inspection controller 405 also controls the inspection apparatus 200 as a whole. An inspection result from this inspection processing is sent to the finisher 300, which is in a later stage. The printed product that has been inspected in this manner is discharged by discharge rollers 404. Although not shown here, the inspection sensor 403 may have a structure that reads from the underside of the conveyor belt 402 as well so as to be capable of handling double-sided printed products.

Figure 4B:
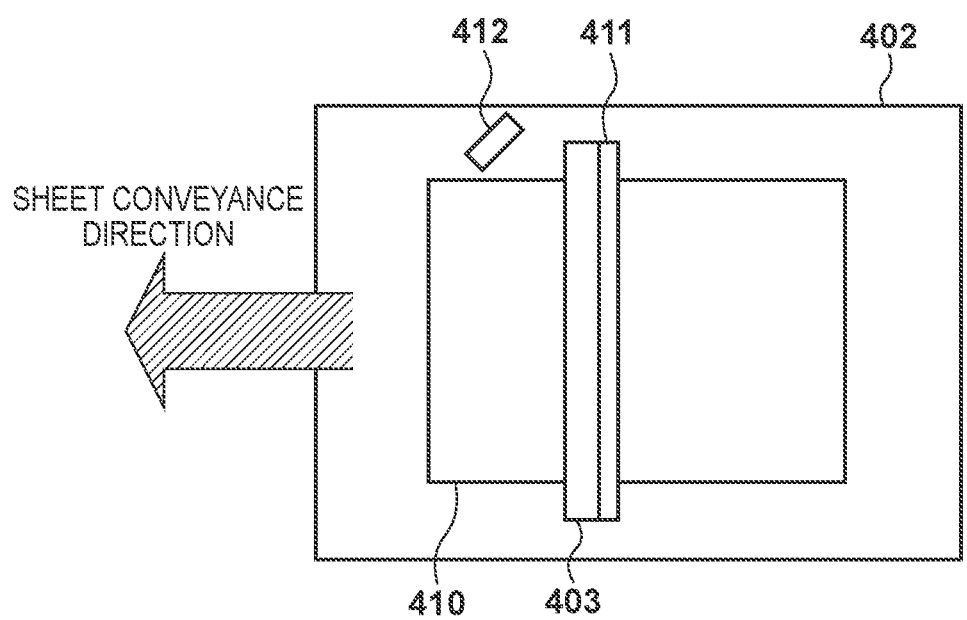
FIG. 4B depicts a top view of a conveyor belt viewed from an inspection sensor side.

FIG. 4B depicts a top view of the conveyor belt 402 viewed from the inspection sensor 403 side.

Here, the inspection sensor 403 is a line sensor that reads, on a line-by-line basis, an image of the entirety of a printed product 410 that has been conveyed, as illustrated in the drawing. An illumination device 411 for reading images irradiates the printed product when reading using the inspection sensor 403. An illumination device 412 for detecting skew is used to detect whether the printed product 410 is skewed with respect to the conveyance direction during conveyance by the conveyor belt 402. The illumination device 412 for detecting skew reads an image of a shadow at an edge of the conveyed printed product 410 and detects skew by illuminating the printed product 410 from an oblique direction. In the first embodiment, the reading of the shadow image at the edge of the printed product is performed by the inspection sensor 403, but may be performed by another reading sensor aside from the inspection sensor 403.

Figure 5:
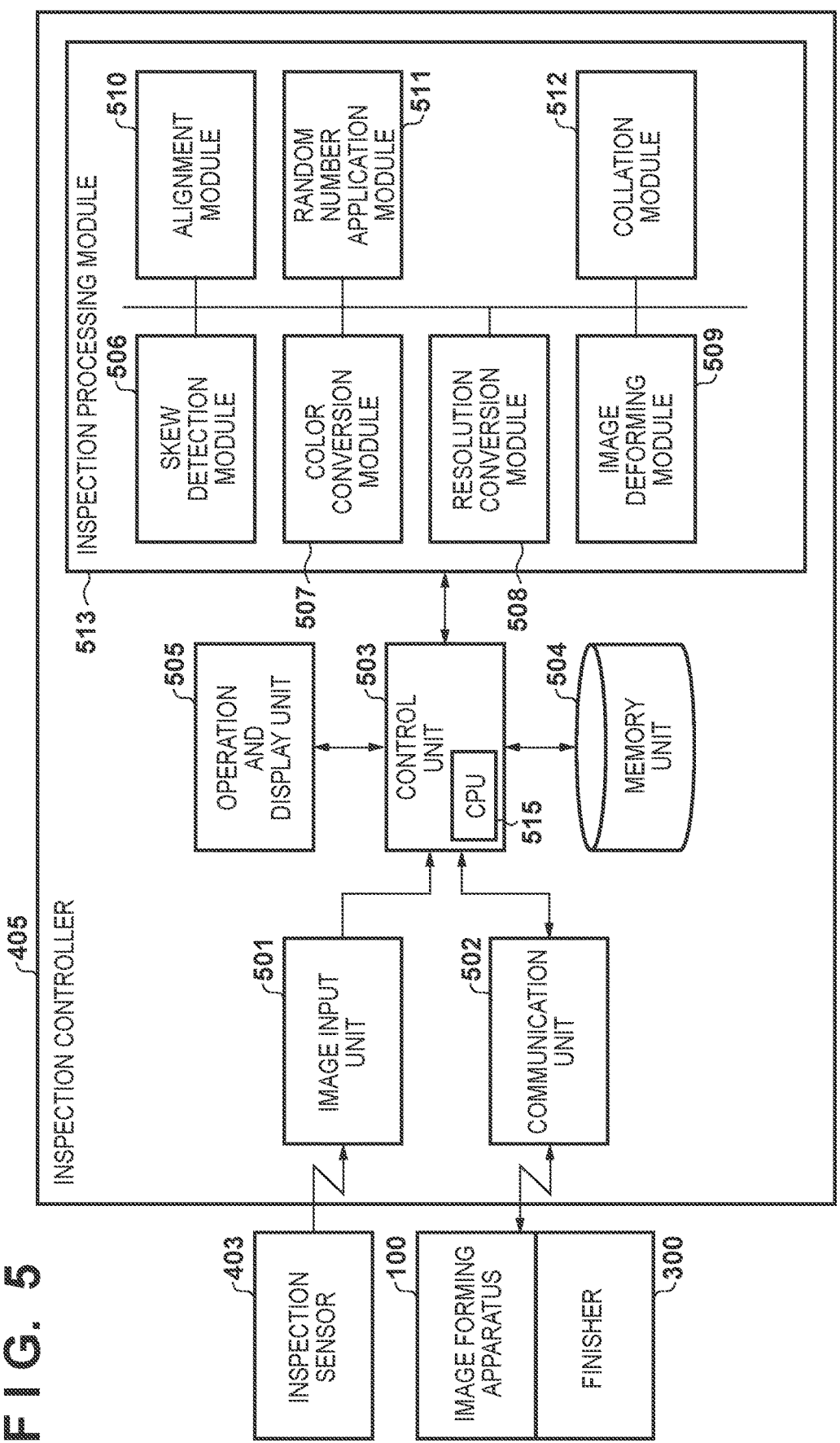
FIG. 5 is a block diagram for describing the functional configuration of an inspection controller of the inspection apparatus according to the first embodiment.

FIG. 5 is a block diagram for describing the functional configuration of the inspection controller 405 of the inspection apparatus 200 according to the first embodiment.

All of the control by the inspection controller 405 is performed by a control unit 503. The control unit 503 includes a CPU 515, and the CPU 515 executes various types of processing (described later) by executing programs loaded into a memory unit 504. An image input unit 501 receives the scanned image data to be inspected, which has been read and obtained by the inspection sensor 403 ("scanner image" or "inspection image" hereinafter). The CPU 515 saves the received scanned image in the memory unit 504. A communication unit 502 communicates with the controller 21 of the image forming apparatus 100. This communication includes receiving image data corresponding to the scanned image and used for printing (reference image data), and transmitting and receiving inspection control information. The CPU 515 also saves the received reference image data ("reference image" hereinafter) and inspection control information in the memory unit 504.

One of the pieces of inspection control information exchanged with the image forming apparatus 100 is synchronization information for achieving correspondence between the scanned image and the reference image, such as print job information, print copy number information, page order information, and the like. Another piece of the inspection control information includes inspection result information and control information for controlling the operations of the image forming apparatus 100 in accordance therewith. The synchronization information is necessary for synchronizing the reference image and the scanned image for cases where the order in which the scanned image, and the reference image used to print the scanned image, are received by the inspection controller 405 in a different order for double-sided printing, printing multiple copies, or the like. Furthermore, because a single reference image may correspond to a plurality of scanned images, the synchronization information is required for synchronizing the reference image with the scanned images. The inspection control information exchanged with the finisher 300 includes inspection result information and control information that controls the operations of the finisher 300 in accordance therewith.

The operations of an inspection processing module 513 are controlled by the CPU 515 of the control unit 503. Based on the synchronization information, which is one piece of the inspection control information exchanged with the image forming apparatus 100 as described above, the control unit 503 sequentially performs the inspection processing on the corresponding inspection image and reference image pair using the inspection processing module 513. The inspection processing module 513 will be described in detail later.

When the inspection processing ends, the result of the determination is sent to the control unit 503 and displayed in an operation and display unit 505. When the determination result indicates a defect, the control of the image forming apparatus 100 and the finisher 300 is switched through the communication unit 502 using a method specified in advance by the user through the operation and display unit 505. For example, processing such as stopping the image forming processing performed by the image forming apparatus 100 and switching the discharge tray of the finisher 300 to an escape tray is performed.

The configuration of the inspection processing module 513 will be described next.

A skew detection module 506 is a module that detects the angle of skew in the scanned image. As described earlier with reference to FIG. 4B, the scanned image is scanned such that a shadow appears at the edge of the printed product. This is because the inspection sensor 403 scans the printed product, which is drawn into the inspection apparatus 200 and conveyed on the conveyor belt 402, for a shadow at the edge produced when illuminated by the illumination device 412 for detecting skew. This shadow is used to detect the angle of skew in the printed product. Correction processing is performed by an image deforming module 509 (described later) based on the angle of skew detected in this manner.

A color conversion module 507 is a module that performs color conversion between the scanned image and the reference image. The reference image is image data rasterized in the CMYK color space by the image processing unit 105 of the image forming apparatus 100, and the scanned image is image data in the RGB color space obtained through the reading by the inspection sensor 403. The color conversion module 507 converts the reference image into an RGB image. A CMYK_to_RGB lookup table (a table for converting from CMYK to RGB), such as that illustrated in FIG. 13C, may be used for the conversion, for example.

In this case, the pixel data at a grid point is color-converted to RGB by referring to this conversion table, but the pixel data not at a grid point is interpolated from the adjacent grid points to obtain the RGB value.

Figures 13A, 13B, 13C:
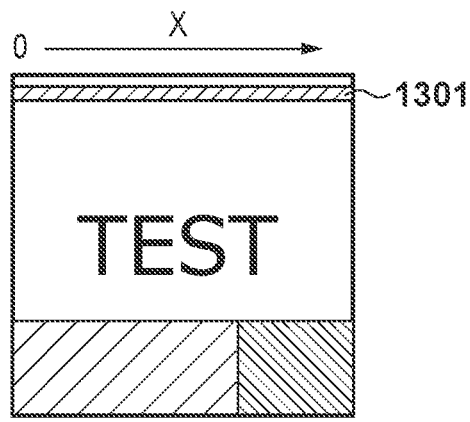
FIG. 13A is a diagram illustrating an example of a reference image according to embodiments.
FIG. 13B is a diagram illustrating an affine transformation formula.
FIG. 13C is a diagram illustrating an example of a CMYK_to_RGB lookup table.

FIG. 13A depicts a view illustrating an example of the reference image.

A region 1301 is a non-printing section ("paper white" hereinafter) in the reference image, and indicates a pixel region which is one-dimensional on the X-axis. The X coordinates of the region 1301 are taken as 0 to N. Because the region 1301 is paper white, all of the pixels in the region 1301 have CMYK values of (0, 0, 0, 0), and when converted by the color conversion module 507 using the above-described CMYK to RGB conversion table, the resulting RGB values are (220, 220, 220). Note that the RGB values are 8-bit values from 0 to 255, and thus the RGB values are converted into (220, 220, 220) so as not to be saturated during random number addition (described later). The color conversion may also use a CMYK to RGB conversion table that takes into account results from a random number application module 511 (described later).

A resolution conversion module 508 is a module that performs resolution conversion such that the scanned image and the reference image have the same resolution. The resolution of the scanned image and the reference image may differ at the point in time when those images are input to the inspection controller 405. Furthermore, there are cases where the resolution used in the modules of the inspection processing module 513 and the input resolution are different. In such a case, the resolution is converted by this module. For example, assume that the scanned image is 600 dpi for the main scan and 300 dpi for the sub scan, and the reference image is 1200 dpi for the main scan and 1200 dpi for the sub scan. If the resolution required by the inspection processing module 513 is 300 dpi for both the main scan and the sub scan, the respective images are reduced/magnified, and both images are set to 300 dpi for both the main scan and the sub scan. A publicly-known method may be used for this magnification method, taking into account the computational load and the required precision. For example, if the SINC function is used to change the magnification, the computational load is heavy but a high-precision magnification result can be obtained. Meanwhile, if the nearest neighbor method is used, the computational load is light but a low-precision magnification result is obtained.

The image deforming module 509 is a module that deforms the scanned image, the reference image, or the like. There are geometric differences between the scanned image and the reference image due to stretching and contraction of the paper and skew during printing, skew during scanning, and the like. The image deforming module 509 corrects the geometric differences by deforming the image based on the information obtained by the skew detection module 506, an alignment module 510 (described later), and the like. For example, the geometric differences are linear transformations (rotation, scaling, shearing) and parallel movement. These geometric differences can be expressed as affine transformations, and correction can be performed by obtaining affine transformation parameters from the skew detection module 506, the alignment module 510, and the like. Note that the information obtained from the skew detection module 506 is only parameters pertaining to rotation (angle of skew information).

The alignment module 510 is a module that aligns the scanned image and the reference image. It is assumed that the scanned image and the reference image input to this module are images of the same resolution. Note that the higher the input resolution is, the better the accuracy of the alignment is, but the computational load increases. An inspection image and a reference image used by a collation module 512 (described later) can be obtained by the image deforming module 509 performing corrections based on the parameters obtained through the alignment. Various alignment methods are conceivable as the alignment method, but in the first embodiment, in order to reduce the computational load, a method for performing alignment on the entire image using information from a partial region of the image, instead of from the entire image, is used. The alignment according to the first embodiment includes three steps, namely selecting an alignment patch, performing alignment for each patch, and estimating the parameters of the affine transformation. The following will describe each of the steps.

Selecting an alignment patch will be described first. Here, "patch" refers to a quadrangular region within the image. When selecting an alignment patch, a plurality of patches suited to alignment are selected from the reference image. A patch having a large corner feature amount within the patch can be considered as a patch suited to alignment. A "corner feature" is a feature in which two distinct edges in different directions are present locally in the vicinity of each other (an intersection between two edges). The corner feature amount is a feature amount indicating the strength of the edge feature. Various methods have been proposed based on differences in the modeling of "edge features".

A publicly-known method called the "Harris corner detection method", for example, is one such method for calculating the corner feature amount. The Harris corner detection method calculates a corner feature amount image from a horizontal direction differential image (a horizontal direction edge feature amount image) and a vertical direction differential image (a vertical direction edge feature amount image). This corner feature amount image is an image expressing the edge amount of the weaker of the two edges that constitute the corner feature. A corner feature is expected to be a strong edge for both edges, so even if the edge is relatively weak, the magnitude of the corner feature amount is expressed by whether a strong edge amount is present.

The corner feature amount image is calculated based on the reference image, and a part having a large corner feature amount is selected as a patch suited to alignment. If a region having a large corner feature amount is simply selected in sequence as a patch, there are cases where the patches will be selected only from a biased region. In such a case, the number of regions where no patches are present in the periphery increases, and thus image deformation information of that region cannot be used, which means the state is not suited to alignment for the entire image. Accordingly, when selecting a patch, it is taken into account that the patches are distributed throughout the image, instead of simply considering the corner feature amount. Specifically, even if the corner feature amount of a given patch candidate region is not large with respect to the entirety of the image, if the value in the local region of the image is large, the patch is selected. Doing so makes it possible to distribute the patches throughout the reference image. The size of the patch, the number of patches (or the density), and the like are used as parameters in the patch selection. As patches increase in size and the number of patches increases, the accuracy of the alignment improves, but the computational load increases.

The alignment for each patch will be described next. The alignment for each patch is performed between the alignment patch in the reference image selected in the previous stage and a patch in the corresponding scanned image.

Two types of information are obtained as a result of the alignment, the first being central coordinates (refpX_i, refpY_i) of the alignment patch at an i-th position in the reference image (where i=1 to N, and N is the number of patches). The second is a position of those central coordinates (scanpX_i, scanpY_i) within the scanned image. The alignment method may be any shift amount estimation method capable of obtaining the relationship between (refpX_i, refpY_i) and (scanpX_i, scanpY_i). For example, a method is conceivable in which the alignment patch and the corresponding patch are carried over to the frequency space using a Fast Fourier Transform (FFT), the correlation therebetween is found, and the shift amount is estimated.

Finally, estimation of affine transformation parameters will be described. Affine transformation is a coordinate conversion method expressed by the formula indicated in FIG. 13B.

In this formula, there are six types of affine transformation parameters, namely a, b, c, d, e, and f Here, (x, y) corresponds to (refpX_i, refpY_i), and (x', y') corresponds to (scanpX_i, scanpY_i). This correspondence relationship, obtained from N patches, is used to estimate the affine transformation parameters. For example, the affine transformation parameters can be obtained using the least-squares method. Based on the affine transformation parameters obtained in this manner, post-alignment correction image data is generated by deforming the reference image or the scanned image using the image deforming module 509. A set of the reference image and the inspection image (scanned image) used for collating in the collation module 512 can therefore be obtained.

The random number application module 511 is a module that applies random numbers to the reference image. The random numbers applied are for adjusting the image differences between the scanned image and the reference image, and even when there are no defects, there are differences between the scanned image and the reference image. These differences arise due to the influence of the characteristics of the image forming apparatus, the influence of scanner characteristics, and the like. The characteristics of the image forming apparatus include color reproducibility, dot gain, gamma characteristics, and the like. The scanner characteristics include color reproducibility, S/N ratio, scanner MTF, and the like. For the color reproducibility of the image forming apparatus, the scanner, and the like, the differences are eliminated by the color conversion module 507. To do so, the random number application module 511 applies random numbers to the reference image in order to remove differences in other noise parts. A flow in which, for example, a random number pattern i-th in the horizontal direction and j-th in the vertical direction for a 9×9 size, as illustrated in FIGS. 7A and 7B, is applied to each of regions of the reference image divided as illustrated in FIG. 8, will be described as an example.

Figures 7A, 7B, 8:
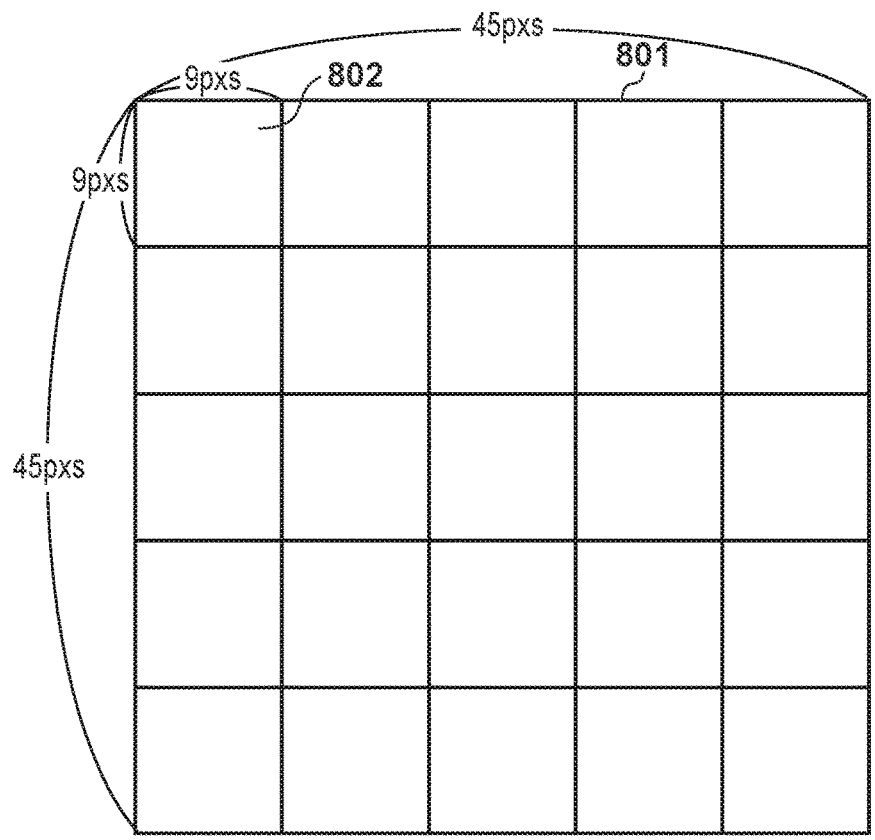
FIGS. 7A and 7B are diagrams illustrating an example of a random number map according to the first embodiment.
FIG. 8 is a diagram illustrating an example of dividing a reference image according to the first embodiment.

FIGS. 7A and 7B are diagrams illustrating an example of a random number map according to the first embodiment. FIG. 8 is a diagram illustrating an example of dividing the reference image according to the embodiment.

As illustrated in FIG. 8, a reference image 801 having 45 vertical pixels (hereinafter, pixel=px) and 45 horizontal pxs is divided into a plurality of regions having the same size as the random number pattern. The application of random numbers will be described here using a region 802 illustrated in FIG. 8 as an example. The image of this region 802 is a coordinate system from the upper-left origin (0, 0). Random numbers are added to this image by applying a random number pattern 701 illustrated in FIG. 7A. The random numbers added here are the random numbers at coordinates (i, j) of the random number pattern 701 corresponding to the pixel coordinate positions. For example, when the pixel corresponding to coordinates (1, 0) is assumed to have RGB values (100, 101, 102), the random numbers added thereto are random numbers at coordinates (i=1, j=0) of the random number pattern 701. In the example in FIG. 7A, the random number at coordinates (1, 0) is "1", and thus "1" is added to each of the RGB values. By similarly applying random numbers to the entire reference image, the random numbers can be applied to each region of the divided reference image.

Likewise, random numbers can be applied to the entire scanned image by dividing the scanned image into a plurality of regions and performing similar processing on all of the regions of the divided scanned image.

Here, small changes to the magnitude of the random numbers produce effects. In the first embodiment, the random numbers are changed between 0 and 2, but when the pixel values can be calculated in decimal increments in the internal processing, the pixel values may be changed in decimal increments of 0 to 1. Here, it is necessary to apply a magnitude or noise of a luminance that is not detected as a defect.

Although the first embodiment describes an example in which a random number greater than or equal to 0 is applied, the present invention is not limited thereto. For example, a positive and negative value centered on 0 may be used, or a random number may be subtracted rather than added.

Although the random number pattern is not particularly limited, it is desirable that a random number pattern that includes noise and a random number pattern that does not include noise be included in the window size used for block matching through a proximity search (described later). Taking the random number map 701 illustrated in FIG. 7A as an example, "0", where no noise is included in the window, and "1" or "2", where noise is included, are included in any pixel of interest. Note that the random number pattern is not limited thereto, and a random number pattern may be provided for each RGB value, for example.

An example of the application of random numbers will be described here using the reference image illustrated in FIG. 13A as an example.

Figure 14A:
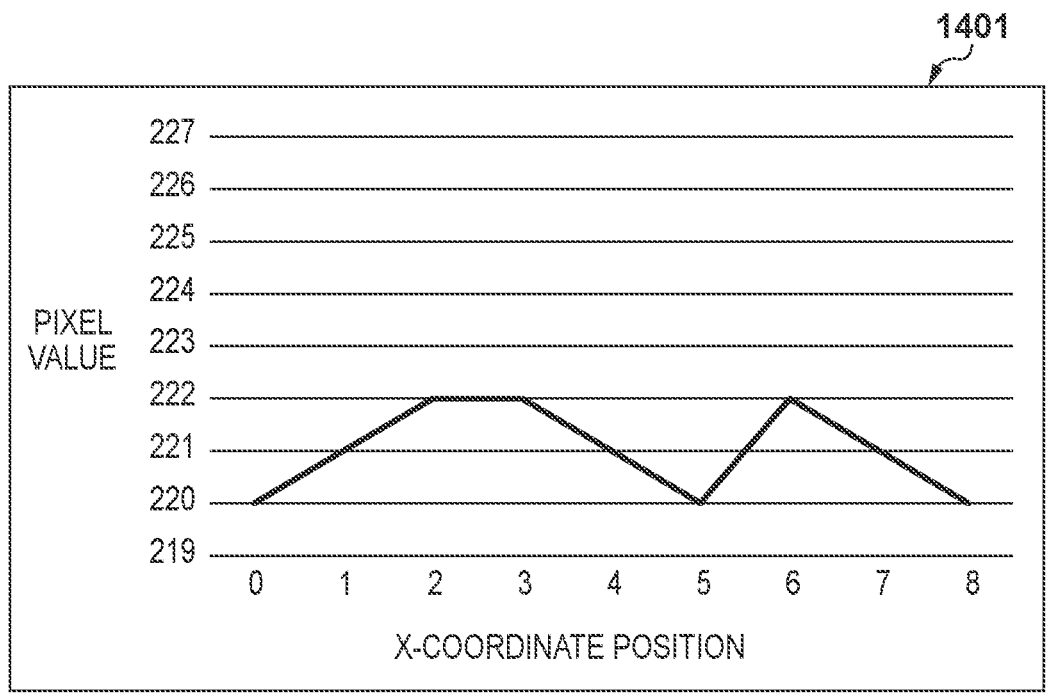
FIG. 14A is a diagram illustrating an example of pixel values when random numbers are added to a paper-white part of the reference image according to the first embodiment.

The RGB values of the region 1301 are as converted by the color conversion module 507 (220, 220, 220). This one-dimensional region is expressed as coordinates (X, 0) (X is 0 to 8), and the random number pattern 701 is added to the pixels corresponding to each coordinate. The result of the addition is shown in FIG. 14A, as a graph 1401. The vertical axis of the graph 1401 represents each RGB pixel value, and the horizontal axis represents the X coordinate. The graph 1401 shows an example in which the random numbers in the first row (j=0) of the pattern 701 illustrated in FIG. 7A have been added. In the reference image, it can be seen that paper white is always a constant pixel value, but fluctuates as a result of adding the random numbers.

Returning again to FIG. 5, the collation module 512 is a module for collating the inspection image (scanned image) and the reference image. The inspection image and the reference image input to this module are image data of the same resolution. In addition, it is assumed that the reference image or the inspection image has been corrected by the image deforming module 509 based on the information obtained by the alignment module 510, such that the images can be compared.

The collation module 512 generates a collation image using the reference image to which the random numbers have been applied by the random number application module 511 and the inspection image. Here, when generating the collation image, it is possible to detect defects with high precision by further aligning the positions with high precision based on the information obtained by the alignment module 510. In the first embodiment, high-precision alignment is realized by block matching through a proximity search. The collation processing is performed based on parameters communicated from the operation and display unit 505. Details of the collation processing will be given later. Note that high-precision alignment is not limited to block matching. Fine alignment may be performed in a narrow region based on the information obtained by the alignment module 510, and thus the alignment may therefore be feature point alignment in a local region or the like.

The operation and display unit 505 is a touch screen user interface, and accepts, from the user, the settings for the processing performed by the inspection processing module 513. For example, the operation and display unit 505 displays the settings screen illustrated in FIG. 10, and accepts settings for the image processing performed by the inspection processing module 513 from the user.

Figure 10:
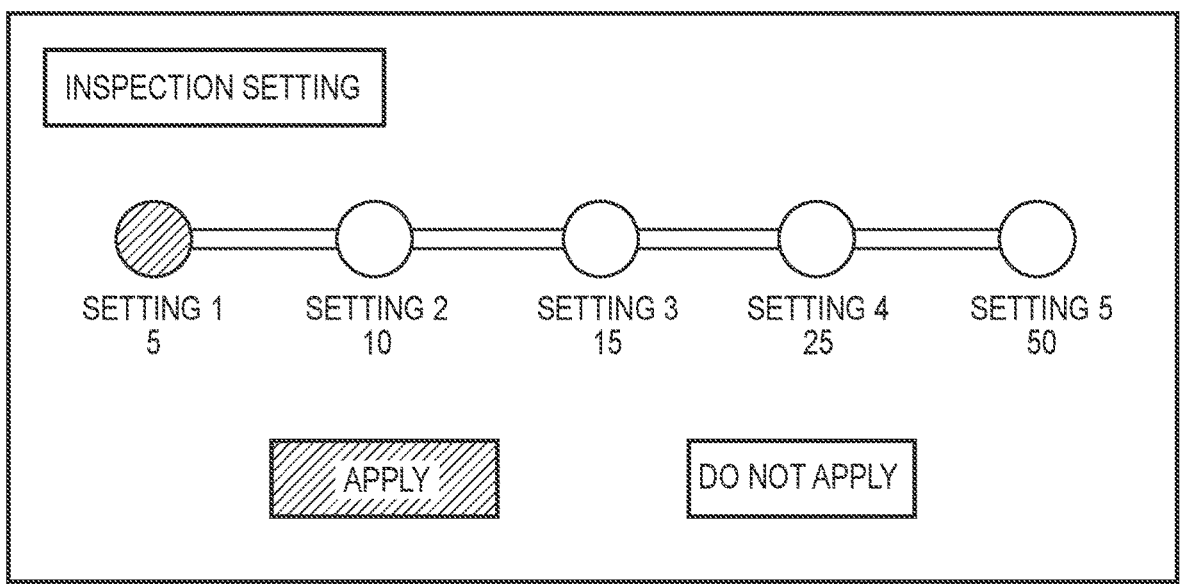
FIG. 10 depicts a view illustrating an example of a UI screen displayed in an operation and display unit of the inspection apparatus according to the first embodiment.

FIG. 10 depicts a view illustrating an example of a UI screen displayed in the operation and display unit 505 of the inspection apparatus 200 according to the first embodiment.

Here, settings 1 to 5 are set as inspection settings that can be adjusted by the user. For example, when setting 1 is set, the collation module 512 determines there is a defect when a color difference of soiling, scratches, or the like determined by the inspection of the inspection image is greater than or equal to "5". On the other hand, when setting 5 is set, the collation module 512 determines there is a defect when a color difference of soiling, scratches, or the like determined by the inspection of the inspection image is greater than or equal to "50". In the example in FIG. 10, the lower the setting number of the inspection settings are, the more likely the collation module 512 is to determine a defect for color differences caused by small amounts of soiling, slight scratches, and the like. In this manner, the user can set a threshold at which the collation module 512 determines a defect is present by selecting one of the setting buttons, from setting 1 to setting 5, and pressing the "apply" button. Calculating the color difference will be described in detail later with reference to collation determination processing. Note that in the example in FIG. 10, the color difference parameters are associated in advance with respective setting values. Accordingly, the color difference parameters corresponding to the setting values selected by the user are communicated to the collation module 512 by the operation and display unit 505.

In the first embodiment, the color difference of the detected soiling and scratches is adjusted based on the setting value indicated in FIG. 10, but the configuration is not limited thereto, and the size of the detected soiling and scratches may be set instead, for example. For example, the size may be set to a range of 0.1 mm to 3 mm or the like.

The inspection processing performed by the inspection apparatus 200 according to the first embodiment will be described next.

FIG. 6 is a flowchart for describing the inspection processing performed by the inspection apparatus 200 according to the first embodiment. The processing described in this flowchart is realized by the CPU 515 of the control unit 503 executing programs stored in the memory unit 504. At this time, the CPU 515 functions as the respective processing modules of the inspection processing module 513 illustrated in FIG. 5, and the results of the processing are held by the memory unit 504 and used in subsequent processing.

First, in step S601, the CPU 515 performs preprocessing of the inspection processing. At this time, the CPU 515 selects the pair of the scanned image and the reference image to be processed using the inspection control information received from the image forming apparatus 100, which is held in the memory unit 504, via the communication unit 502. The CPU 515 then processes the scanned image using the skew detection module 506, and obtains skew information of the scanned image. Then, based on the skew information, the image deforming module 509 performs correction processing on the scanned image. By performing the aforementioned processing for generating the reference image in parallel with this, the reference image is taken as an image suited to the inspection processing by the color conversion module 507.

The processing then proceeds to step S602, where the CPU 515 performs alignment using the scanned image and the reference image obtained in step S601. At this time, the CPU 515 converts the scanned image and the reference image to a predetermined resolution (e.g., 300 dpi×300 dpi) using the resolution conversion module 508. The scanned image and the reference image, which are now in the predetermined resolution, are then processed by the alignment module 510 to obtain the affine transformation parameters. Then, using the affine transformation parameters obtained from the alignment module 510, the CPU 515 performs the correction processing on the reference image using the image deforming module 509, sets the coordinate system of the reference image to be the same as the scanned image such that the image can be used for collation.

The processing then proceeds to step S603, where the CPU 515 performs collation/determination processing using the inspection image (the scanned image) and the reference image obtained in step S602. At this time, the CPU 515 functions as the collation module 512, and collates the inspection image with the reference image. The processing then proceeds to step S604, where the CPU 515 displays a result of the collation processing performed in step S603 in the operation and display unit 505. Here, simply displaying an image indicating a final determination result makes it difficult to know what kind of image defect occurred, and thus an image indicating the final determination results is composited with the inspection image and displayed in the operation and display unit 505. This compositing may be use any compositing method as long as it is a compositing method in which the location of the image defect is easy to ascertain. For example, a part (defective part) determined to be "1" in the image indicating the final determination results may be displayed by being set to red and superimposed on the inspection image.

The collation processing will be described next with reference to the flowchart illustrated in FIG. 11.

Figure 11:
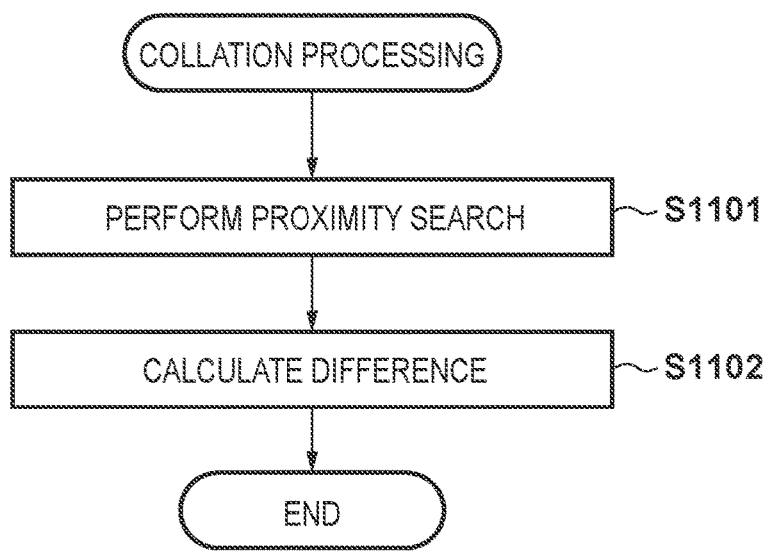
FIG. 11 is a flowchart for describing collation processing performed by the inspection apparatus according to the first embodiment.

FIG. 11 is a flowchart for describing the collation processing performed by the inspection apparatus 200 according to the first embodiment. The processing illustrated in this flowchart is realized by the CPU 515 of the control unit 503 executing programs stored in the memory unit 504. At this time, the CPU 515 functions as the collation module 512 illustrated in FIG. 5.

First, in step S1101, the collation module 512 performs high-precision alignment through the proximity search in the reference image and the inspection image. Although the reference image and the inspection image are aligned by the image deforming module 509 as described earlier, it is necessary to perform further local alignment in order to detect defects with high precision. Accordingly, in the first embodiment, high-precision alignment is performed through a proximity search using block matching. Here, schematic diagrams illustrating the time of the proximity search are provided.

Figure 12A:
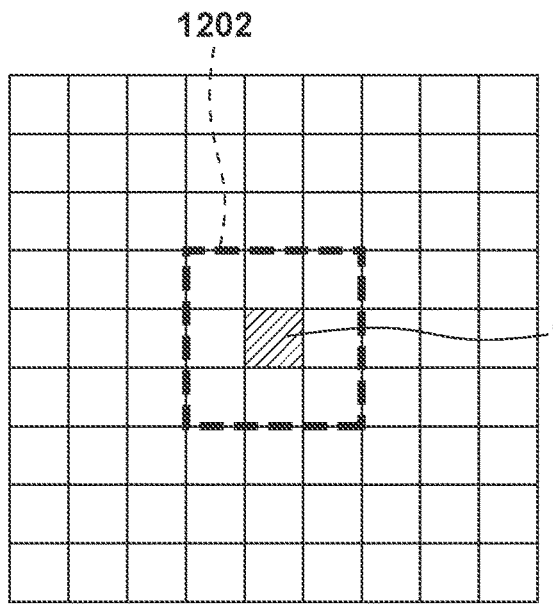
FIGS. 12A and 12B are schematic diagrams illustrating a proximity search according to the first embodiment.
Figure 12B:
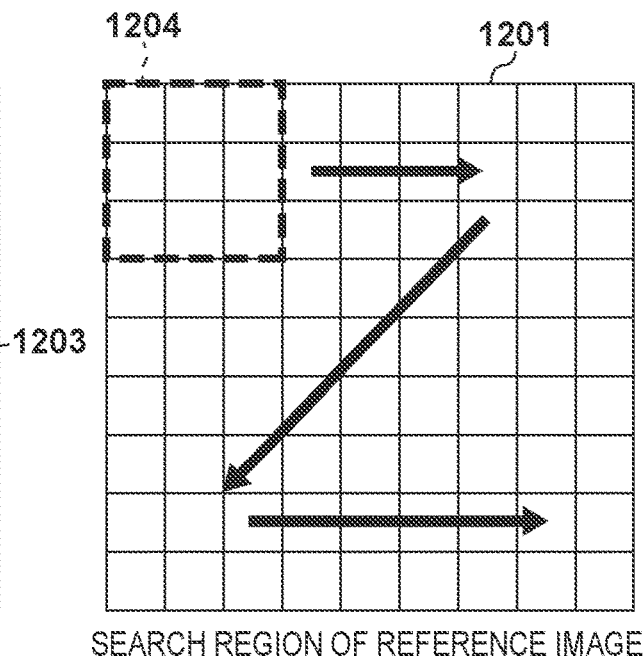

FIGS. 12A and 12B are schematic diagrams illustrating the proximity search according to the first embodiment.

FIG. 12A illustrates an example of an inspection image, and FIG. 12B illustrates an example of a reference image. An area 1201 (a predetermined region) of the reference image indicates a search region for the reference image. A search window 1202 of the inspection image uses the eight neighboring pixels of a pixel 1203 as a target region. A search window 1204 corresponding to the search window 1202 is then set in the area 1201 of the reference image. The search window 1204 is then moved to the right by four pixels in the area 1201 (x+4), and when the search window 1204 reaches the right end of the area 1201, the x-coordinate is returned to its original state, the y-coordinate is changed to −4, and the search window 1204 is moved to a position directly below the first position of the search window 1204. This operation is repeated, such that in this area 1201, a region of the reference image that has the least different from the search window 1202 in the inspection image is searched out in sequence. A difference $\Delta$area obtained here is the total value of the target region for a color difference $\Delta$RGB indicated by the following Formula (1).

$$\Delta RGB = \sqrt{R^2 + G^2 + B^2} \qquad \text{Formula (1)}$$

Here, a difference between a case where random numbers have been applied by the random number application module 511 and a case where random numbers have not been applied will be described.

The region 1301 of the reference image illustrated in FIG. 13A is paper white, which has been described as RGB (220, 220, 220) in the explanation of the color conversion module 507. When block matching through the proximity search is performed in this region 1301, only the pixels in the paper white region are not assigned a superiority or inferiority. On the other hand, when random numbers have been applied, the maximum value and the minimum value of $\Delta$area change according to each search window region. Then, in the block matching through the proximity search, the part having the minimum value in the search window region is selected. Accordingly, the alignment can be performed with a higher level of precision when random numbers are applied to the reference image.

The processing then proceeds to step S1102, where the collation module 512 calculates a differential image between the reference image and the inspection image, which have been re-aligned in step S1101. The first embodiment takes a color difference $\Delta$G, which is the difference for G in RGB, as the color difference for detecting a defect, and will describe an example in which this color difference is calculated. Although $\Delta$G, which is the difference for G in the RGB values, is taken as the color difference in the first embodiment, defects may be detected using the $\Delta$RGB as the color difference.

In addition, for a grayscale image, simple absolute value of the difference may be used, or a function for obtaining the absolute value of the difference taking into account gamma characteristics may be used.

Figure 14B:
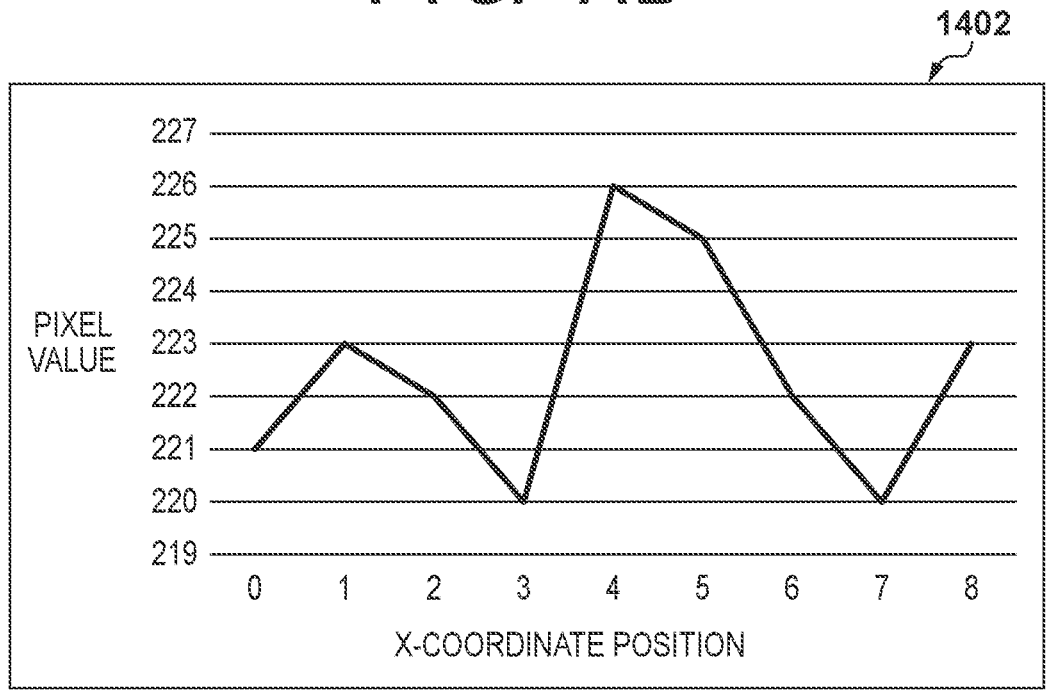
FIG. 14B is a graph illustrating G among the RGB values of an inspection image according to the first embodiment.

FIG. 14B shows a graph 1402 in which G is indicated among the RGB values of the inspection image. The vertical axis of this graph represents the G pixel value, and the horizontal axis represents the X coordinate. Note that the X coordinates described here are a one-dimensional region of the inspection image at the same position as in the reference image illustrated in FIG. 13A, and are assumed to contain no defects but to contain noise.

Figure 15A:
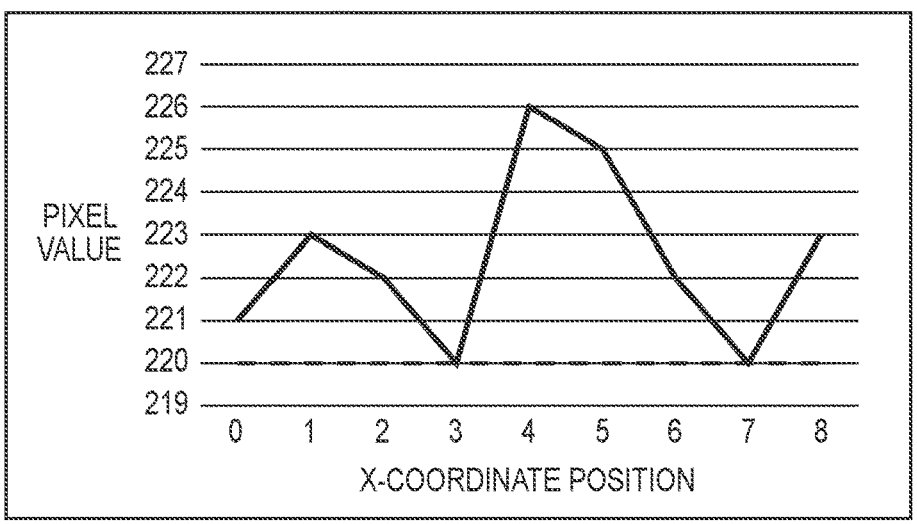
FIGS. 15A to 15C are graphs illustrating a comparative example of an inspection image and a reference image according to the first embodiment.
Figure 15B:
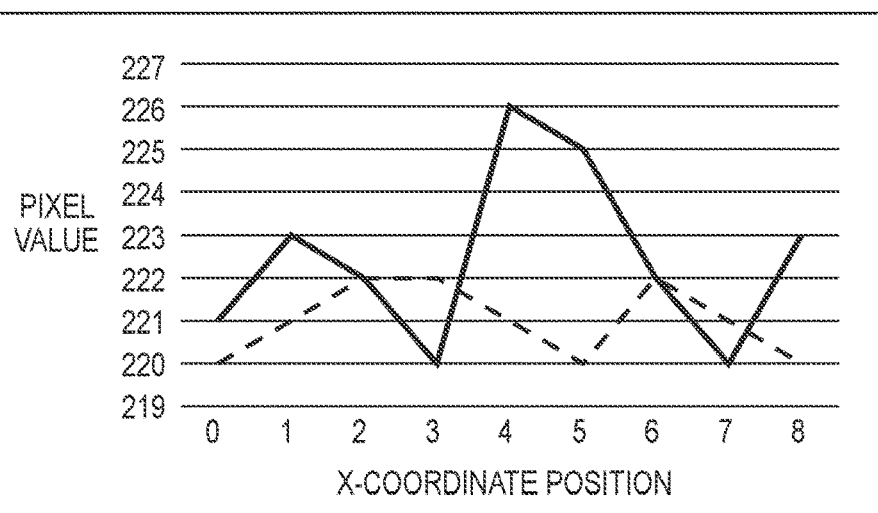
Figure 15C:
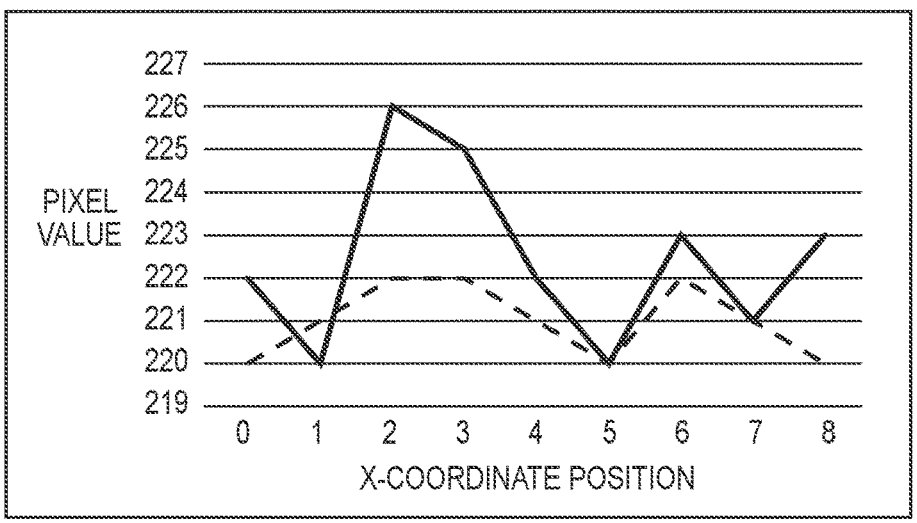

FIGS. 15A to 15C are diagrams illustrating graphs of the reference image and the inspection image according to the first embodiment.

In FIGS. 15A to 15C, the solid lines represent G for the same inspection image as in FIG. 14B, and the broken lines represent the reference image. In FIGS. 15A to 15C, the vertical axes of the graphs represent the G pixel value, and the horizontal axes represent the X coordinate. FIG. 15A shows a case where no noise has been added to the reference image. FIG. 15B illustrates a case where the result of adding the random number pattern 701 to the reference image is compared to a graph 1402 of G in the inspection image shown in FIG. 14B, as illustrated in FIG. 14A. FIG. 15C shows a comparative example between an inspection image and a reference image when alignment is performed through the proximity search using the collation module 512.

In FIG. 15A, ΔG is further away by at least 5 at the X coordinate positions 4 and 5. At this time, as illustrated in FIG. 10 described above, when the inspection settings set through the operation and display unit 505 are the setting 1, ΔG being at least "5" is taken as a defect and is therefore an erroneous detection.

In FIG. 15B, as in FIG. 15A, the difference is at least 5 at the X coordinate positions 4 and 5, and thus erroneous detections occur for the setting 1.

On the other hand, in FIG. 15C, the difference which is the most distant is "4" at the X coordinate position 2, and thus a defect is not detected here, even with setting 1 described above.

As described above, the aforementioned processing and the processing performed by the random number application module 511 would originally cause erroneous detections to occur due to noise contained in the inspection image. However, by locally aligning the inspection image and the reference image through the proximity search in a state where random numbers have been applied to the reference image too, the collation determination processing can be performed in a state where noise present in the inspection image has been eliminated, making it possible to suppress erroneous detections.

Note that the random numbers to be applied may be changed in accordance with the inspection settings based on the parameters communicated from the operation and display unit 505. Specifically, a table may be provided so as to increase the random numbers (noise amount) to be applied when the inspection setting is high (large), and to reduce the random numbers (noise amount) to be applied when the inspection setting is low (small), and may be switched according to the inspection settings.

A random number pattern 702 illustrated in FIG. 7B is an example of the random number pattern when the inspection settings have been increased by one. When the inspection settings increase in this manner, the table is switched to one in which the random numbers (noise amount) are increased. This is because the effect of suppressing erroneous detections can be further enhanced by changing the values of the random numbers to be applied in a range of magnitudes and luminances not detected as defects.

Variation on First Embodiment

Image processing pertaining to a variation on the first embodiment of the present invention will be described hereinafter.

The foregoing first embodiment described an example in which a reference image is a digital image used in printing, and the collation is made more precise by canceling the noise components in the inspection image and the reference image. However, in the inspection system, there are also cases where in addition to using a digital image for the reference image, a scanned image, obtained by printing and scanning in the same manner as the inspection image and having the user determine that there is no defect, is used as a reference image.

When a scanned image is taken as the reference image, the scanned image contains noise due to unevenness in the surface properties, transmittance, and the like of the paper, the S/N ratio of the scanner, and the like. It is therefore not necessary to apply random numbers. Accordingly, when the scanned image is to be used as the reference image, the random number application module 511 is switched so as not to apply random numbers.

As described above, according to this variation, even when the reference image is a digital image used for printing, the collation processing determination can be performed in a state where noise components are canceled out even when the reference image is, like the inspection image, a scanned image obtained by scanning a printed product. This makes it possible to suppress erroneously detecting defects in the inspection image.

Second Embodiment

Image processing pertaining to a second embodiment of the present invention will be described hereinafter.

The foregoing first embodiment described a method in which a noise component present in an inspection image is canceled out by applying random numbers to the reference image, and a suitable collation determination is then made.

In the first embodiment, when applying the random numbers, the random numbers are applied in accordance with the random number maps illustrated in FIGS. 7A and 7B, regardless of the pixel value of the pixel of interest. However, the noise contained in the inspection image is greater in the paper white parts, highlight parts, and the like than in dark parts. This is because the inspection sensor 403 is an RGB light-receiving device, and thus the sensitivity is higher in highlight parts.

Accordingly, in the second embodiment, the values of the random numbers applied are changed in accordance with the pixel values. This makes it possible to apply more suitable random numbers to various parts, such as the dark parts, paper white parts, and the highlight parts, which leads to the suppression of erroneous detections. Note that only differences from the first embodiment will be described hereinafter. The system configuration, the hardware configurations of the image forming apparatus 100 and the inspection apparatus 200, and so on according to the second embodiment are the same as those described above in the first embodiment, and will therefore not be described.

The random number application module 511 according to the second embodiment applies suitable random numbers by referring to the pixel values of the reference image and multiplying coefficients based on the pixel values by the random numbers to be applied.

Like the first embodiment, descriptions will be given using the image region 802 of the reference image illustrated in FIG. 8. When the coordinate (2, 0) is RGB values (0, 96, 192), the random number pattern adds i=2 and j=0. Here, the following Formula (2) shows an example of the calculation of R', in which a random number value rand of the random number pattern (i, j) is applied to a coefficient D of dark parts, a coefficient H for paper white parts, and R of the RGB values at the coordinate (2, 0). In the following Formula (2), the random number added increases with proximity to paper white, and decreases with proximity to dark parts. This makes it possible to apply high (large) random numbers to pixels in bright parts susceptible to noise, such as paper white or highlights, and low (small) random numbers to pixels that are less susceptible to noise, such as dark parts.

$$R'=(((H-D)*R) \div 255+D)*rand+R \qquad \text{(Formula 2)}$$

According to this formula, when R=0, D=1, and H=5, rand is "2" and R' becomes 10. Calculating for G and B in the same manner makes it possible to apply suitable random numbers having referred to the pixel values of the reference image.

Although the random numbers are obtained through a linear arithmetic formula in the random number application, the present invention is not limited thereto. The random numbers may be obtained by referring to a lookup table corresponding to the pixel values.

As described above, according to the second embodiment, changing the values of the random numbers assigned in accordance with the pixel values of the reference image makes it possible to assign more suitable random numbers to various parts, such as dark parts, paper white parts, or highlight parts, which has an effect of suppressing erroneous detections.

Third Embodiment

Processing pertaining to a third embodiment of the present invention will be described hereinafter.

The foregoing first embodiment described a method in which a noise component present in an inspection image is canceled out by applying random numbers to the reference image, and a suitable collation determination is then made. In the first embodiment, when the random numbers are applied, random numbers set in advance are applied. However, the amount, distribution, and the like of the noise change depending on individual differences between print output sheets 410, inspection sensors 403, and the like. Accordingly, the third embodiment will describe an example in which random numbers are applied taking into account individual differences between print output sheets 410, inspection sensors 403, and the like. Note that only differences from the first embodiment will be described hereinafter. The system configuration, the hardware configurations of the image forming apparatus 100 and the inspection apparatus 200, and so on according to the third embodiment are the same as those described above in the first embodiment, and will therefore not be described.

Figure 16:
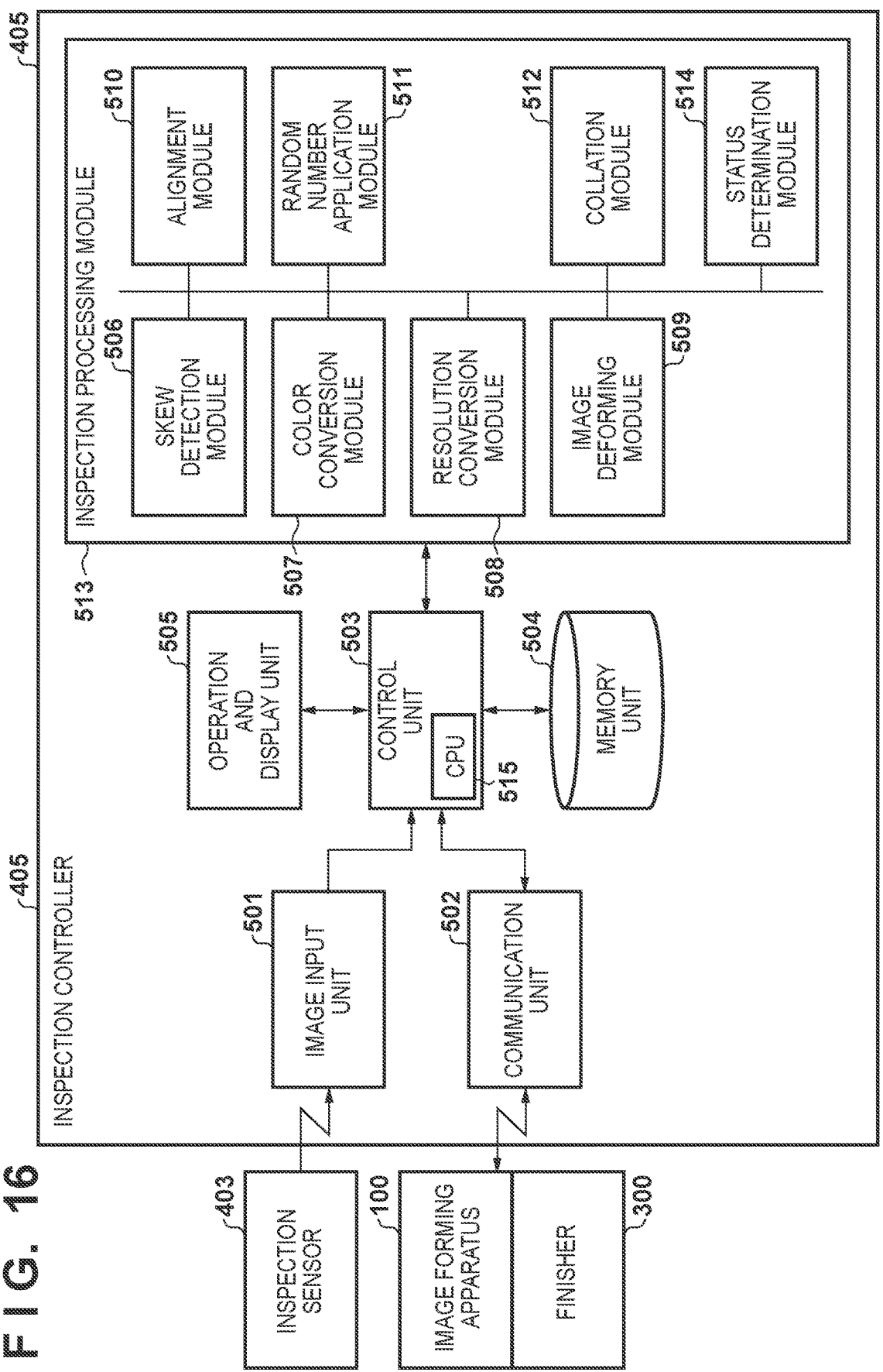
FIG. 16 is a block diagram for describing the functional configuration of an inspection controller of the inspection apparatus according to the third embodiment.

FIG. 16 is a block diagram for describing the functional configuration of an inspection controller of an inspection apparatus according to the third embodiment. Note that in FIG. 16, the same reference numerals are given to parts having the same configuration as those shown in the aforementioned FIG. 5, and descriptions thereof will be omitted.

The inspection processing module 513 according to the third embodiment includes a status determination module 514 for determining the status of the print output sheet 410, the inspection sensor 403, and the like. The status determination module 514 executes printing processing without printing anything onto the print output sheet 410, and measures the amount of noise by reading the print output sheet 410 using the inspection sensor 403. In the inspection sensor 403, four corner regions of the print output sheet 410, such as those illustrated in FIG. 9, are read, and the values thereof are sent to the status determination module 514.

Figure 9:
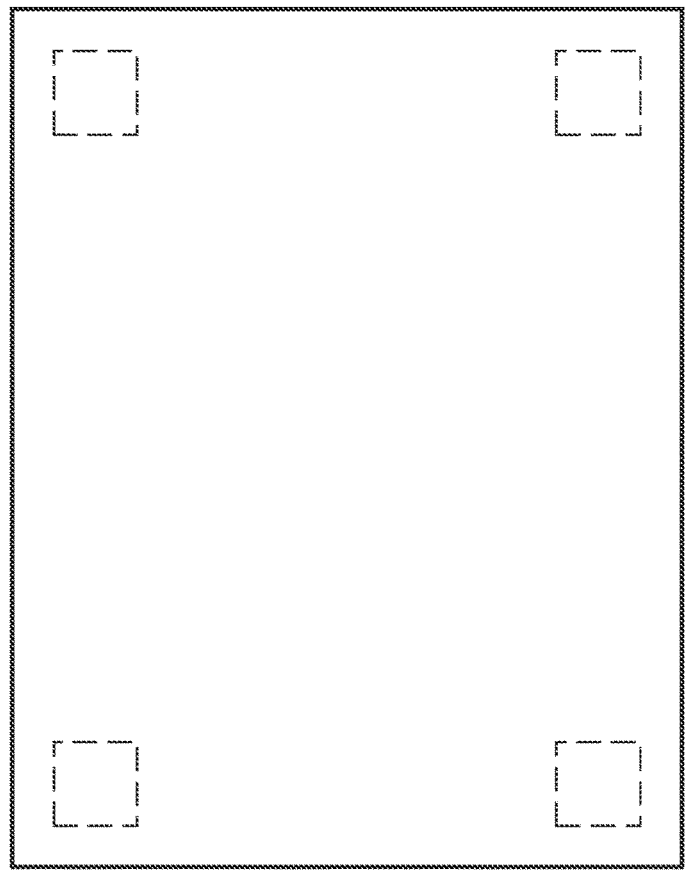
FIG. 9 is a diagram illustrating four corner regions of a print output sheet according to a third embodiment.

FIG. 9 is a diagram illustrating the four corner regions of the print output sheet 410 according to the third embodiment.

Figure 17:
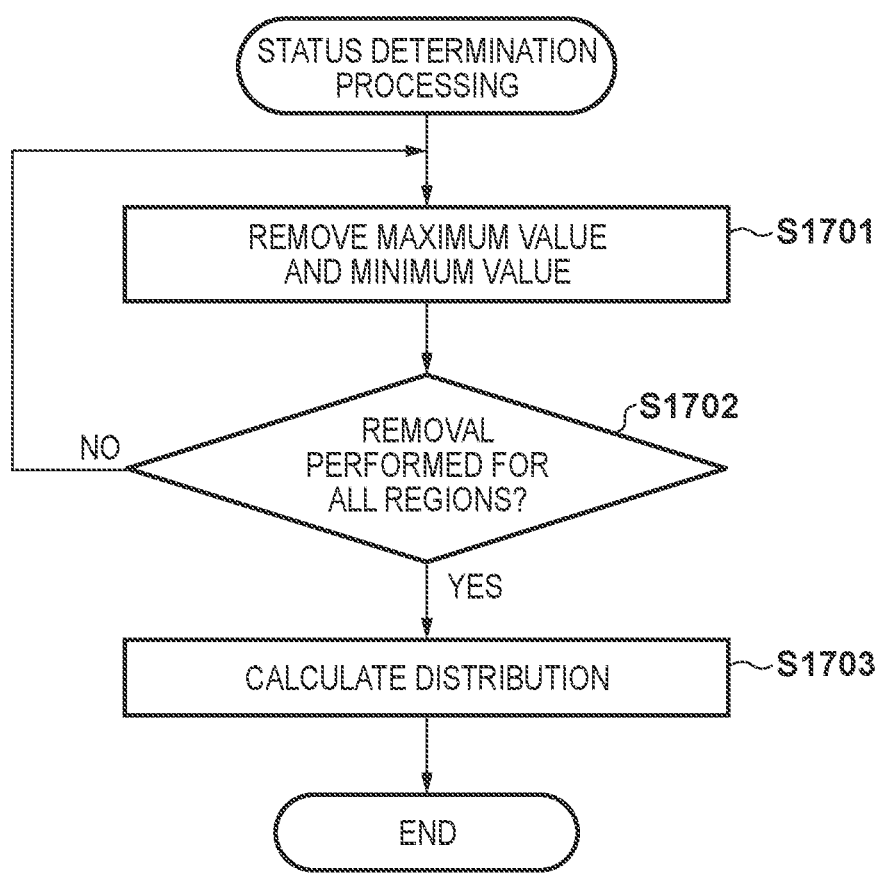
FIG. 17 is a flowchart for describing status determination processing performed by the inspection apparatus according to the third embodiment.

FIG. 17 is a flowchart for describing status determination processing performed by the inspection apparatus 200 according to the third embodiment. The processing described in this flowchart is realized by the CPU 515 of the control unit 503 executing programs stored in the memory unit 504. At this time, the CPU 515 functions as the status determination module 514 illustrated in FIG. 16.

First, in step S1701, the status determination module 514 removes a maximum value and a minimum value of RGB values of a noise amount in each of the four corner regions of the print output sheet 410 read out by the inspection sensor 403. The processing then proceeds to step S1702, where the status determination module 514 determines whether the processing of step S1701 is complete for all regions. If not complete, step S1701 is repeated, but if complete, the processing proceeds to step S1703. In step S1703, the status determination module 514 calculates a variance value of the noise amount in all four corner regions. Here, of the RGB values, R will be used as an example. Taking the total number of pixels from which the maximum value and the minimum value of R have been removed in step S1701 as n, a variance value $S^2$ is obtained through the following Formula (3), using each pixel value xi and an average of the pixel values xi.

$$S^2 = \frac{1}{n}\sum_{n=1}^{n}(x_i - \overline{x})^2 \qquad \text{Formula (3)}$$

Obtaining this value for G and B in the same manner makes it possible to calculate all the variance values of the RGB values.

Although the third embodiment takes into account the processing speed and sets the regions to be read by the inspection sensor to the four corners, the present invention is not limited thereto. RGB values of several percent from the maximum value and several percent from the minimum value may be removed from the entire sheet, and the variance values may be calculated for the remaining RGB values.

The random number application module 511 changes the random numbers to be applied based on the variance values calculated by the status determination module 514. Here, the random number map used based on the variance values may be switched, a standard deviation and a random number map may be generated, or the like. For example, if the threshold is set to "5" and the calculated variance value exceeds the threshold, the random number map may be switched from the random number map 701 illustrated in FIG. 7A to the random number map 702 in which the random numbers to be applied are increased, such as that illustrated in FIG. 7B.

As described above, according to the third embodiment, the noise amount can be adjusted taking into account individual differences between print output sheets 410, inspection sensors 403, and the like, which makes it possible to detect defects with higher precision.

Although the third embodiment describes an example in which the random numbers to be applied are switched based on individual differences between print output sheets 410, inspection sensors 403, and the like, the present invention is not limited thereto. CMYK tones may be read out and the random numbers may be changed by taking into account the characteristics, status, and so on of the scanner, the printer, and the like of the image forming apparatus 100.

Other Embodiments

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-093097, filed Jun. 8, 2022 which is hereby incorporated by reference herein in its entirety.

What is claimed is:

1. An inspection apparatus that inspects an image formed on a recording medium by a printing apparatus, the inspection apparatus comprising:
   one or more controllers including one or more processors and one or more memories, the one or more controllers being configured to:
   store, as a reference image, image data used to form an image on the recording medium;
   obtain target image data to be inspected, by reading an image to be inspected formed on the recording medium;
   apply random numbers to respective pixels of the reference image;
   align the reference image to which the random numbers have been applied with the target image data; and
   perform collation processing between the reference image and the target image data that have been aligned.

2. The inspection apparatus according to claim 1,
   wherein, in the applying, the reference image is divided into a plurality of regions and a random number pattern of the random numbers is applied to each of the plurality of regions.

3. The inspection apparatus according to claim 2,
   wherein, in the applying, the one or more controllers are configured to apply the random numbers based on a pixel value in the reference image.

4. The inspection apparatus according to claim 3,
   wherein, in the applying, the one or more controllers are configured to apply higher random numbers when the pixel value in the reference image indicates a bright part than when the pixel value in the reference image indicates a dark part.

5. The inspection apparatus according to claim 1,
   wherein, in the applying, the one or more controllers are configured to apply the random numbers for reducing a difference between the reference image and the target image data, the difference being caused by a noise component present in the target image data.

6. The inspection apparatus according to claim 1,
   wherein the one or more controllers are further configured to obtain a variance in pixel values obtained by optically reading a recording medium on which no image is formed, and
   in the applying, the one or more controllers are configured to change the random numbers based on the variance.

7. The inspection apparatus according to claim 1,
   wherein the one or more controllers are further configured to set a threshold for determining whether or not a defect is present in the target image data based on the collation processing.

8. The inspection apparatus according to claim 7,
   wherein, in the applying, the one or more controllers are configured to change the random numbers based on the set threshold.

9. The inspection apparatus according to claim 8,
   wherein, in the applying, the one or more controllers are configured to increase random numbers when the threshold increases and reduce the random numbers when the threshold decreases.

10. The inspection apparatus according to claim 1,
    wherein the one or more controllers are further configured to convert a color space of the reference image to a color space of the target image data.

11. The inspection apparatus according to claim 1,
    wherein, in the aligning, the one or more controllers are configured to perform the aligning by performing a proximity search using block matching between a search window set in the target image data and a predetermined region of the reference image to which the random numbers have been added, and selecting a block in which a difference between pixel values is minimum.

12. The inspection apparatus according to claim 1,
    wherein the one or more controllers are further configured to convert a resolution of the reference image or the target image data such that the resolution of the reference image and the resolution of the target image data are the same.

13. A method of controlling an inspection apparatus that inspects an image formed on a recording medium by a printing apparatus, the method comprising:
    storing, as a reference image, image data used to form an image on the recording medium;
    obtaining image data to be inspected, by optically reading the image formed on the recording medium;
    applying random numbers to respective pixels of the reference image;
    aligning the reference image to which the random numbers have been applied with the target image data; and performing collation processing between the reference image and the target image data that have been aligned.

14. A non-transitory computer-readable storage medium storing a program for causing a processor to execute a method of controlling an inspection apparatus that inspects an image formed on a recording medium by a printing apparatus, the method comprising:
   storing, as a reference image, image data used to form an image on the recording medium;
   obtaining image data to be inspected, by optically reading the image formed on the recording medium;
   applying random numbers to respective pixels of the reference image;
   aligning the reference image to which the random numbers have been applied with the target image data; and
   performing collation processing between the reference image and the target image data that have been aligned.

15. The inspection apparatus according to claim 1,
   wherein, in the applying, the one or more controllers are configured to apply the random numbers based on values of respective pixels of the reference image.

* * * * *